(12) United States Patent
Kanbayashi et al.

(10) Patent No.: US 11,065,920 B2
(45) Date of Patent: Jul. 20, 2021

(54) TIRE-MOUNTED SENSOR, DIAGNOSIS HISTORY MEMORY DEVICE AND DIAGNOSIS NOTIFICATION DEVICE

(71) Applicant: DENSO CORPORATION, Kariya (JP)

(72) Inventors: Ryosuke Kanbayashi, Kariya (JP); Takatoshi Sekizawa, Kariya (JP); Masashi Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 193 days.

(21) Appl. No.: 16/324,132

(22) PCT Filed: Jun. 23, 2017

(86) PCT No.: PCT/JP2017/023197
§ 371 (c)(1),
(2) Date: Feb. 8, 2019

(87) PCT Pub. No.: WO2018/030000
PCT Pub. Date: Feb. 15, 2018

(65) Prior Publication Data
US 2019/0168549 A1    Jun. 6, 2019

(30) Foreign Application Priority Data

Aug. 12, 2016 (JP) .............................. JP2016-159000
Jun. 12, 2017 (JP) .............................. JP2017-115278

(51) Int. Cl.
*B60C 19/00* (2006.01)
*G01M 17/02* (2006.01)
(Continued)

(52) U.S. Cl.
CPC .............. *B60C 23/04* (2013.01); *B60C 19/00* (2013.01); *B60R 16/023* (2013.01); *G01M 17/02* (2013.01); *B60C 2019/004* (2013.01)

(58) Field of Classification Search
CPC .. G01M 17/02; G01M 17/021; G01M 17/022; G01M 17/027; G01M 17/025;
(Continued)

(56) References Cited

U.S. PATENT DOCUMENTS 3,967,498 A * 7/1976 Pezzillo .............. G01M 17/025
73/146
4,317,105 A * 2/1982 Sinha .................... F16D 66/021
340/438
(Continued)

FOREIGN PATENT DOCUMENTS

| JP | 5495971 B2 | 5/2014 | |
| JP | 2015174637 A | 10/2015 | |
| WO | WO-8203686 A1 * | 10/1982 | ............... G01N 3/30 |

OTHER PUBLICATIONS

U.S. Appl. No. 16/313,069, filed Dec. 24, 2018, Mori et al.
(Continued)

*Primary Examiner* — Andre J Allen
(74) *Attorney, Agent, or Firm* — Harness, Dickey & Pierce, P.L.C.

(57) ABSTRACT

A condition in which an abnormality can occur in a tire is accurately detected on the basis of a detection signal from an acceleration sensor used to detect a road surface state and a possibility that an abnormality has occurred in the tire is also detected. In addition, the detection result is stored as a diagnosis history. The diagnosis history or the possibility that an abnormality has occurred in the tire are notified through a notification device in a vehicle body side system so that a user is informed in advance of the possibility that an abnormality has occurred in the tire. In addition, when the diagnosis history is checked through a tool in a car repair shop, etc., the diagnosis history stored in a tire-mounted
(Continued)

sensor is read out. Accordingly, the possibility of abnormality of the tire can be informed also in the car repair shop, etc.

11 Claims, 7 Drawing Sheets

(51) Int. Cl.
   *B60C 23/04* (2006.01)
   *B60R 16/023* (2006.01)
(58) Field of Classification Search
   CPC ...... G01M 17/024; G01M 17/10; G01M 7/08;
   G01M 17/0076; G01M 17/013; G01M
   17/03; G01M 17/04; G01M 17/06; G01M
   17/08; G01M 1/02; G01M 1/045; G01M
   1/12; G01M 1/225; G01M 3/04; G01M
   3/40; G01M 5/0091; G01M 7/02; G01M
   99/00; G01M 99/002; B60C 23/0494;
   B60C 2019/004; B60C 23/0493; B60C
   23/064; B60C 19/00; B60C 23/04; B60C
   23/0488; B60C 23/0498; B60C 23/0496;
   B60C 23/0408; B60C 23/041; B60C
   23/0411; B60C 23/06; B60C 23/20; B60C
   11/246; B60C 23/0486; B60C 23/061;
   B60C 11/243; B60C 99/00; B60C
   11/0083; B60C 13/003; B60C 2009/2038;
   B60C 23/004; B60C 23/02; B60C
   23/0401; B60C 23/0406; B60C 23/0416;
   B60C 23/0433; B60C 23/0455; B60C
   23/0459; B60C 23/0474; B60C 23/0489;
   B60C 23/0491; B60C 25/002; B60C
   25/005; B60C 25/007; B60C 29/02; B60C
   3/04; B60C 99/006; B60C 11/0332; B60C
   11/24; B60C 13/001; B60C 13/02; B60C
   15/0036; B60C 17/02; B60C 2009/0071;
   B60C 2009/2022; B60C 2200/02; B60C
   2200/06; B60C 2200/065; B60C 23/00;
   B60C 23/001; B60C 23/003; B60C
   23/007; B60C 23/008; B60C 23/0413;
   B60C 23/0427; B60C 23/0447; B60C
   23/0454; B60C 23/0457; B60C 23/0462;
   B60C 23/0471; B60C 23/0472; B60C
   23/0476; B60C 23/0479; B60C 23/0484;
   B60C 23/065; B60C 23/066; B60C 23/10;
   B60C 25/0548; B60C 25/056; B60C
   25/132; B60C 25/138; B60C 29/005;
   B60C 9/005; B60C 9/18; B60C 9/1807;
   B60C 9/20; B60C 9/28
   USPC .............................................. 73/146–146.8
   See application file for complete search history.

(56) References Cited

U.S. PATENT DOCUMENTS

| | | | |
|---|---|---|---|
| 2006/0232391 A1* | 10/2006 | Nakatani | B60C 23/0408 340/447 |
| 2006/0267750 A1* | 11/2006 | Lu | B60C 23/062 340/440 |
| 2013/0131915 A1 | 5/2013 | Masago | |
| 2016/0031273 A1* | 2/2016 | Suzuki | B60T 8/1725 73/115.08 |
| 2016/0368501 A1* | 12/2016 | Suzuki | B60W 40/06 |
| 2016/0368502 A1* | 12/2016 | Suzuki | G01M 17/025 |
| 2018/0222458 A1* | 8/2018 | Suzuki | G01M 17/025 |
| 2019/0143988 A1* | 5/2019 | Sekizawa | B60T 8/1763 73/146 |
| 2019/0184773 A1* | 6/2019 | Saito | B60C 23/0422 |
| 2019/0185008 A1* | 6/2019 | Kanbayashi | B60C 23/00 |
| 2019/0225227 A1* | 7/2019 | Mori | B60C 19/00 |
| 2020/0284648 A1* | 9/2020 | Kanbayashi | G01P 3/50 |
| 2020/0309518 A1* | 10/2020 | Kanbayashi | B60W 40/06 |
| 2020/0317204 A1* | 10/2020 | Kanbayashi | B60W 40/06 |

OTHER PUBLICATIONS

U.S. Appl. No. 16/317,052, filed Jan. 11, 2019, Sekizawa et al.
U.S. Appl. No. 16/323,830, field Feb. 7, 2019, Kanbayashi et al.
U.S. Appl. No. 16/322,166, filed Jan. 31, 2019, Kanbayashi et al.

* cited by examiner

GROUND CONTACT ZONE

US 11,065,920 B2

TIRE-MOUNTED SENSOR, DIAGNOSIS HISTORY MEMORY DEVICE AND DIAGNOSIS NOTIFICATION DEVICE

CROSS REFERENCE TO RELATED APPLICATIONS

This application is a U.S. National Phase Application under 35 U.S.C. 371 of International Application No. PCT/JP2017/023197 filed on Jun. 23, 2017. This application is based on and claims the benefit of priority from Japanese Patent Application No. 2016-159000 filed on Aug. 12, 2016 and Japanese Patent Application No. 2017-115278 filed on Jun. 12, 2017. The entire disclosures of all of the above applications are incorporated herein by reference.

TECHNICAL FIELD

The present disclosure relates to a tire-mounted sensor and a diagnosis history memory device, which are capable of storing a diagnosis history such as cuts of a tire, and a diagnosis notification device having the same.

BACKGROUND ART

It is conventionally known as a method for detecting an abnormality of a tire which detects a tire air pressure change by a tire air pressure monitoring system (hereinafter referred to as TPMS). For example, the TPMS includes a sensor transmitter provided with a pressure sensor attached to a road wheel side and a receiver provided at a vehicle body side. The TPMS detects a tire air pressure by transmitting a detection result of the tire air pressure detected by the pressure sensor from the sensor transmitter and receiving the transmitted result at the receiver.

It is important to detect an abnormality of a tire from a safety standpoint of vehicle travel. For this reason, in patent literature 1 for example, it is proposed to detect an abnormality of a tire by executing a frequency analysis on a detection signal of an acceleration sensor attached to a tread of a tire and compare a vibration component in a specified frequency band with a value of normal time.

PRIOR ART LITERATURE

Patent Literature

Patent Literature 1: JP 05495971

SUMMARY

However, according to the TPMS described above, it is not possible to detect an abnormality of a tire such as cuts and recesses of a tire although it is possible to detect a change in a tire air pressure. The tire abnormality is likely to result in tire failure, with which a vehicle is disabled to continue traveling in the end. For avoiding the failure of the tire, which disables vehicle traveling, it is necessary to find out the abnormality of tire in advance of an occurrence of the failure of the tire. However it is difficult to find out the tire abnormality in advance.

The tire abnormality arises when a large impact shock is applied to a tire. According to the method of detecting the tire abnormality by regularly monitoring the vibration component in the specified frequency band, the tire abnormality is detected regardless of whether there arose a situation, which will potentially cause an abnormality to a tire. The tire abnormality is thus detected even when there arose no situation, which will potentially cause the abnormality to the tire. As a result, it is not possible to detect the tire abnormality on condition that the situation which will potentially cause the abnormality is accurately detected.

It is an object of the present disclosure to provide a tire-mounted sensor which is capable of detecting a possibility of occurrence of abnormality of a tire in advance before the tire actually fails on condition that a situation of potential occurrence of abnormality of a 4 tire is accurately detected. It is another object to provide a tire-mounted sensor and a diagnosis history memory device, which are capable of storing a diagnosis history upon detection of a possibility of occurrence of abnormality of a tire, and a diagnosis notification device including the same.

A tire-mounted sensor according to one aspect of the present disclosure comprises a vibration detection unit for outputting an output voltage corresponding to a magnitude of vibration of a tire as a detection signal and a signal processing unit for detecting an application of impact shock to the tire based on a change in an output voltage waveform indicated by the detection signal of the vibration detection unit and detecting a possibility of occurrence of abnormality of the tire by comparison of the output voltages outputted before and after a detection of the application of impact shock.

Thus, the application of the impact shock to the tire, that is, a state which will possibly cause an occurrence of abnormality of the tire, is detected based on the detection signal of the vibration detection unit. When the state which will possibly cause the occurrence of abnormality of the tire arises, the possibility of abnormality of the tire is detected. Thus the tire-mounted sensor is enabled to detect in advance the possibility of occurrence of abnormality of the tire before the tire actually fails by accurately detecting the state which will possibly cause the occurrence of abnormality of the tire.

The tire-mounted sensor according to the aspect described above has a storage unit which stores the possibility of abnormality of the tire as a diagnosis history.

It is thus possible to keep the possibility of abnormality of the tire by storing it as the diagnosis history upon detection of such a possibility. With this storage of the diagnosis history, it is possible to notify a user of the possibility of abnormality of the tire in advance by, for example, notifying the diagnosis history or the possibility of abnormality of the tire through a notification device in a vehicle side system. It is further possible to convey the possibility of abnormality of the tire at a car repair shop and the like by reading out the diagnosis history stored in the tire-mounted sensor in case that the diagnosis history is desired to be confirmed through a tool at the car repair shop and the like.

EMBODIMENT

Figure 1:
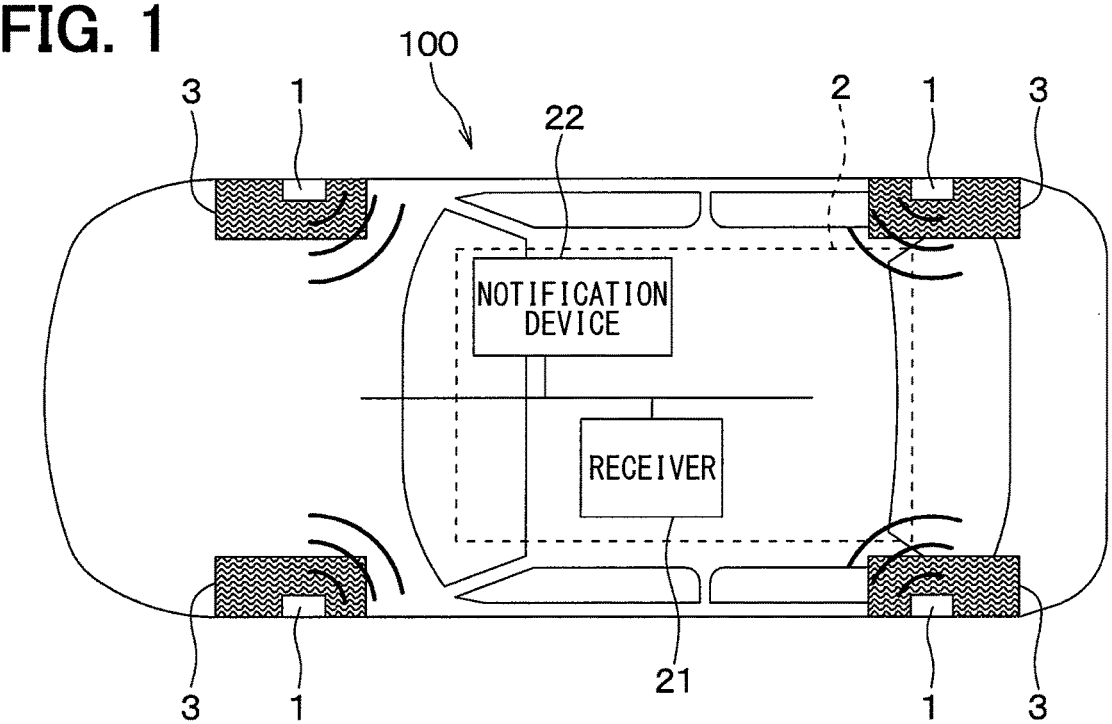
FIG. 1 is a view showing a block configuration of a road surface state estimation device according to a first embodiment, which includes a tire-mounted sensor and is mounted in a vehicle.

Embodiments of the present disclosure will be described below with reference to the drawings. In each embodiment described below, same or equivalent parts are designated with the same reference numerals.

First Embodiment

A road surface state estimation device 100 according to the present embodiment, which includes a tire-mounted sensor 1, will be described with reference to FIG. 1 to FIG. 9. The road surface state estimation device 100 according to the present embodiment estimates a road surface state, on which a vehicle travels. In the present embodiment, a tire-mounted sensor 1, which is applied to the road surface state estimation device 100, is configured to store a diagnosis history about an abnormality of a tire.

Figure 2:
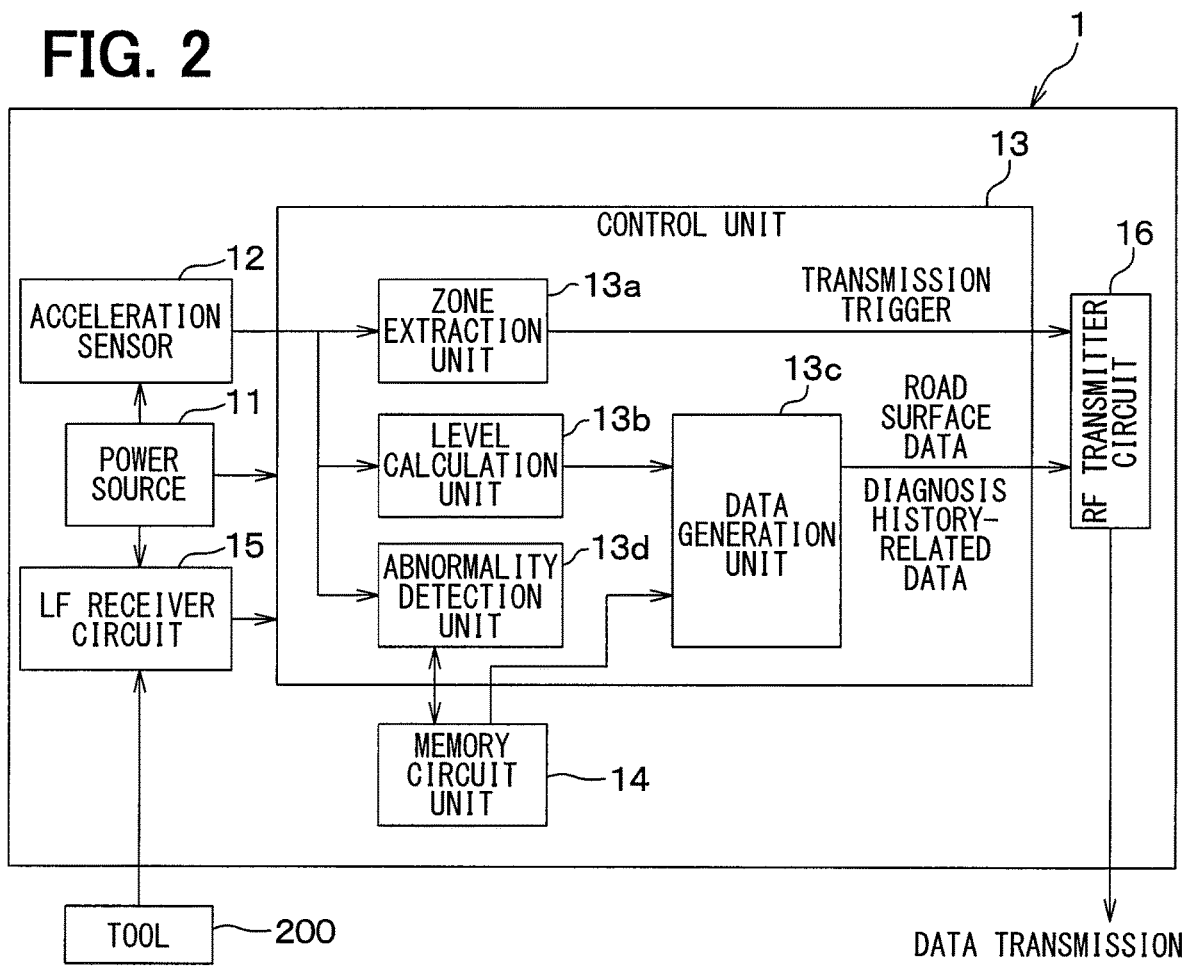
FIG. 2 is a block diagram of the tire-mounted sensor.

As shown in FIG. 1 and FIG. 2, the road surface state estimation device 100 is formed of the tire-mounted sensor 1 provided at a road wheel side and a vehicle side system 2 including various units provided in a vehicle body side. In the vehicle side system 2, a receiver 21 and a notification device 22 are provided.

The road surface state estimation device 100 detects vibrations of a tire 3 provided in each wheel by the tire-mounted sensor 1 and transmits data, which indicate a road surface state such as data indicating a road surface μ between the tire 3 and a travel road, to the receiver 21 side by generating such data based on the vibration. Hereinafter, the road surface μ is referred to as μ data and the data including the μ data and indicating the road surface state is referred to as road surface data. The road surface state estimation device 100 receives the road surface data transmitted from the tire-mounted sensor 1 through the receiver 21 and sends the road surface state indicated by the road surface data from the notification device 22. It is thus possible to send to a driver the road surface data, for example, the road surface μ is low and the road is dry, wet or frozen. In case that the road is slippery, it is further possible to warn such a state to the driver.

The road surface state estimation device 100 detects a possibility of an occurrence of an abnormality such as a cut or recess of the tire based on the vibration of tire by the tire-mounted sensor 1 and stores this detection result as a diagnosis history. By thus storing the diagnosis history, it is possible for the driver to acknowledge the abnormality of the tire in advance before a future tire failure arising from the abnormality of the tire, that is, before the tire failure which will lead to travel failure of the vehicle, arises. Specifically, the tire-mounted sensor 1 and the receiver 21 are configured as described below.

Figure 3:
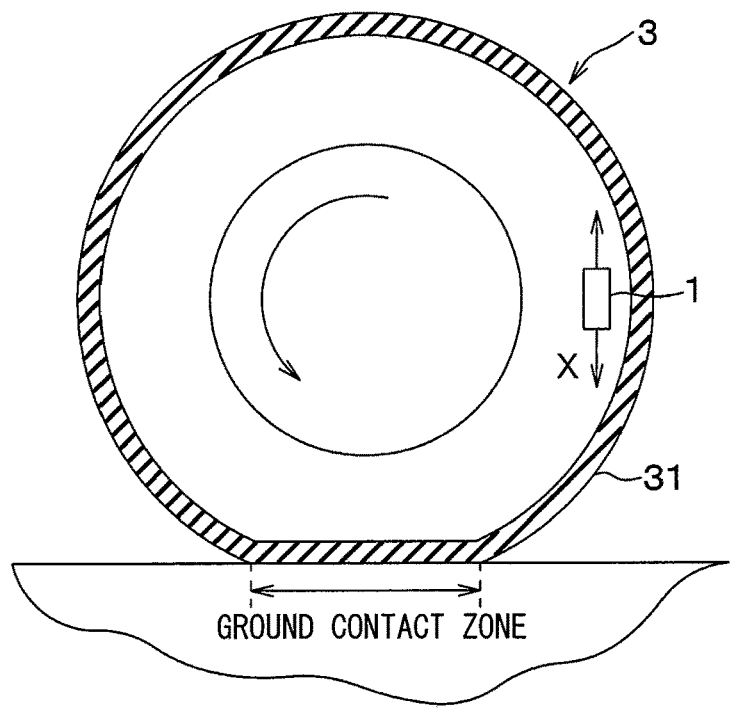
FIG. 3 is a sectional schematic view of a tire to which the tire-mounted sensor is attached.

The tire-mounted sensor 1 is a tire-side device provided at a tire side. As shown in FIG. 2, the tire-mounted sensor 1 is configured to include a power source 11, an acceleration sensor 12, a control unit 13, a memory circuit unit 14, an LF (Low Frequency) receiver circuit 15 and an RF (Radio Frequency) transmitter circuit 16. As shown in FIG. 3, the tire-mounted sensor 1 is provided on a back surface side of a tread 31 of the tire 3.

The power source 11 is formed of a battery, for example, and supplies power to drive each component of the tire-mounted sensor 1.

The acceleration sensor 12 is configured as a vibration detection unit for detecting vibrations applied to a tire. For example, the acceleration sensor 12 outputs an acceleration detection signal as a detection signal corresponding to vibrations in a tire-tangential direction indicated with an arrow X in FIG. 3, that is, a direction tangential to a circular orbit which the tire-mounted sensor 1 depicts when the tire 3 rotates. For more details, the acceleration sensor 12 generates as the detection signal an output voltage, which is positive in one direction and negative in the opposite direction, between two directions indicated with the arrow X.

The control unit 13 is a signal processing unit. The control unit 13 operates to generate road surface data by using the detection signal of the acceleration sensor 12 as a detection signal, which indicates the vibration data in the tire-tangential direction, and processing this detection signal, and sends the road surface data to the RF transmitter circuit 16.

Specifically, the control unit 13 extracts a ground-contact zone of the acceleration sensor 12 during rotation of the tire 3 based on the detection signal of the acceleration sensor 12, that is, a time change of the output voltage of the acceleration sensor 12. The ground-contact zone means an area of a part of the tread 31 of the tire 3, which corresponds to the location of attachment of the acceleration sensor 12 and contacting the road surface. In the present embodiment, since the location of arrangement of the acceleration sensor 12 is the location of arrangement of the tire-mounted sensor 1, the ground-contact zone is the same as the area of a portion of the tread 31 of the tire 3, which corresponds to the location of arrangement of the tire-mounted sensor 1 and is in contact with the road surface. In the following description, the location of arrangement of the tire-mounted sensor 1 in the tread 31 of the tire 3, that is, the location of arrangement of the acceleration sensor 12, is referred to as a device arrangement location.

Since high frequency components included in the detection signal of the acceleration sensor 12 generated in a period of the ground contact zone indicate the road surface state, the control unit 13 extracts the high frequency components from the detection signal and detects the road surface state such as the road surface μ based on the extracted high frequency components.

The control unit 13, thus detecting the road surface state, generates the road surface data indicating the road surface state and executes processing of sending it to the RF transmitter circuit 16. The road surface data is thus sent to the receiver 21 through the RF transmitter circuit 16.

The control unit 13 further has a function of detecting that an abnormality of the tire 3 arose based on the detection signal of the acceleration sensor 12 and stores the detection result indicating the possibility of abnormality in the memory circuit unit 14 as the diagnosis history. The control unit 13 still further has a function of sending data related to the diagnosis history from the RF transmitter circuit 16 when a response related to the diagnosis history is commanded through the tool 200 shown in FIG. 2 or the like.

Specifically, the control unit 13 is formed of a conventional microcomputer including a CPU, a ROM, a RAM, an I/O and the like and executes the processing described above based on a program stored in the ROM or the like. The control unit 13 includes, as functional units for executing such processing, a zone extraction unit 13a, a level calculation unit 13b, a data generation unit 13c and an abnormality detection unit 13d.

Figure 4:
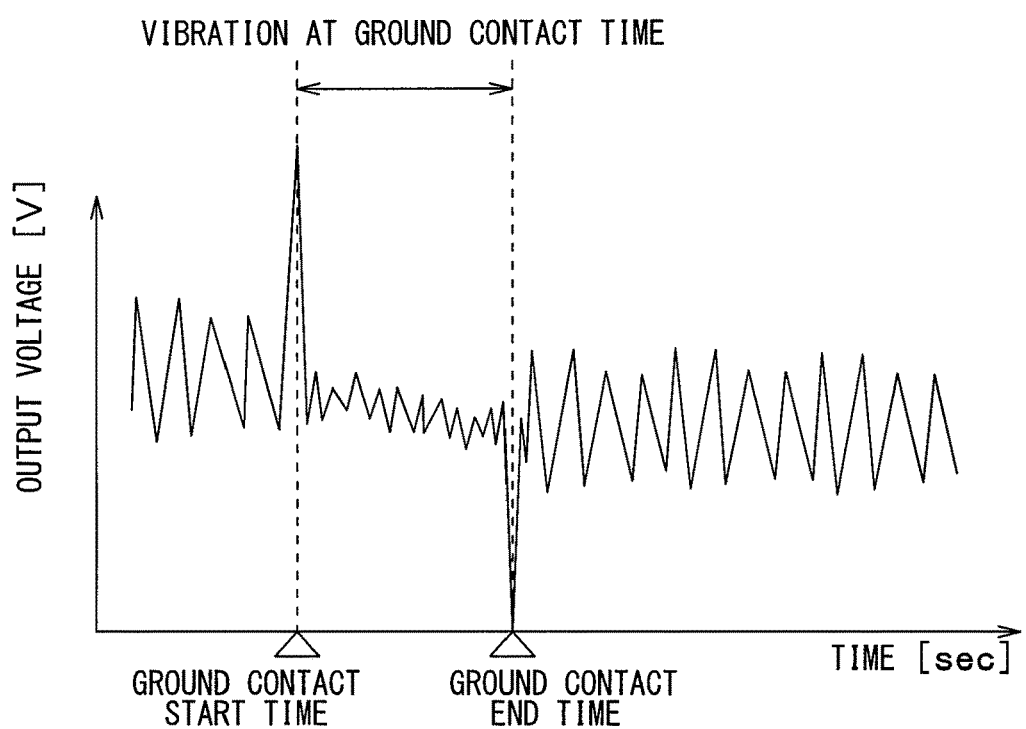
FIG. 4 is a waveform chart showing an output voltage of an acceleration sensor at time of tire rotation.

The zone extraction unit 13a extracts the ground contact zone by detecting a peak value of the detection signal indicated by the output voltage of the acceleration sensor 12. The output voltage waveform of the acceleration sensor 12 during tire rotation changes as shown in FIG. 4, for example. As shown in this figure, at a ground contact start time at which the part corresponding to the device arrangement location starts contacting the ground during the rotation of the tire 3, the output voltage of the acceleration sensor 12 takes a maximum value. The zone extraction unit 13a detects the ground contact start time, at which the output voltage of the acceleration sensor 12 takes the maximum value, as a first peak value timing. Further, as shown in FIG. 4, at a ground contact end time at which the part of the device arrangement location ends contacting the ground during rotation of the tire 3, the output voltage of the acceleration sensor 12 takes a minimum value. The zone extraction unit 13a detects the ground contact end time at which the output voltage of the acceleration sensor 12 takes the minimum value as a second peak value timing.

The output voltage of the acceleration sensor 12 takes the peak values at the above-described timings for the following reasons. When the device arrangement location comes to contact the ground during rotation of the tire 3, the part of the tire 3 having been in generally cylindrical shape near the acceleration sensor 12 is pressed and deformed in a planar shape. Receiving an impact shock at this time, the output voltage of the acceleration sensor 12 takes the first peak value. When the part of the tire 3 corresponding to the device arrangement location leaves the ground surface during rotation of the tire 3, the part of the tire 3 is released from pressurization and restores to the generally cylindrical shape from the planar shape. Receiving the impact shock at the time of restoring the original shape of the tire 3, the output voltage of the acceleration sensor 12 takes the second peak value. As described above, the output voltage of the acceleration sensor 12 takes the first peak value and the second peak value at the ground contact start time and the ground contact end time, respectively. Since a direction of shock at the time when the tire 3 is pressed and a direction of shock at the time when the tire 3 is released from pressurization are opposite, polarities of the output voltages are also opposite.

The zone extraction unit 13a extracts the ground contact zone of the acceleration sensor 12 by extracting the data of the detection signal including the timings of the first peak value and the second peak value and sends that it is within the ground contact zone to the level calculation unit 13b.

Since the output voltage of the acceleration sensor 12 takes the second peak value at the ground contact end time of the acceleration sensor 12, the zone extraction unit 13a transmits a transmission trigger to the RF transmitter circuit 16 at this timing. Thus the road surface data such as $\mu$ data generated by the data generation unit 13c as described below is transmitted from the RF transmitter circuit 16. Since the RF transmitter circuit 16 does not execute the data transmission always but executes the data transmission limitedly at the ground contact end time of the acceleration sensor 12, it is possible to reduce power consumption. Although the RF transmitter circuit 16 is exemplified to execute the data transmission at time when the output voltage of the acceleration sensor 12 takes the second peak value, the RF transmitter circuit 16 may execute the data transmission at other timings. Further, the execution of the data transmission is not limited to once in every one rotation of the tire 3 but may be once in every plural rotations of the tire 3 or plural times in every one rotation of the tire 3.

When it is sent from the control unit 13a that it is within the ground contact zone, the level calculation unit 13b calculates a level of the high frequency components, which arise from vibrations of the tire 3 and is included in the output voltage of the acceleration sensor 12 during the interval of the ground contact zone. The level calculation unit 13b sends such a calculation result to the data generation unit 13c as the road surface data such as the $\mu$ data. The level of the high frequency components is calculated as an index indicating the road surface state such as the road surface $\mu$ for the following reasons described below with reference to FIG. 5A, FIG. 5B and FIG. 6.

Figure 5A:
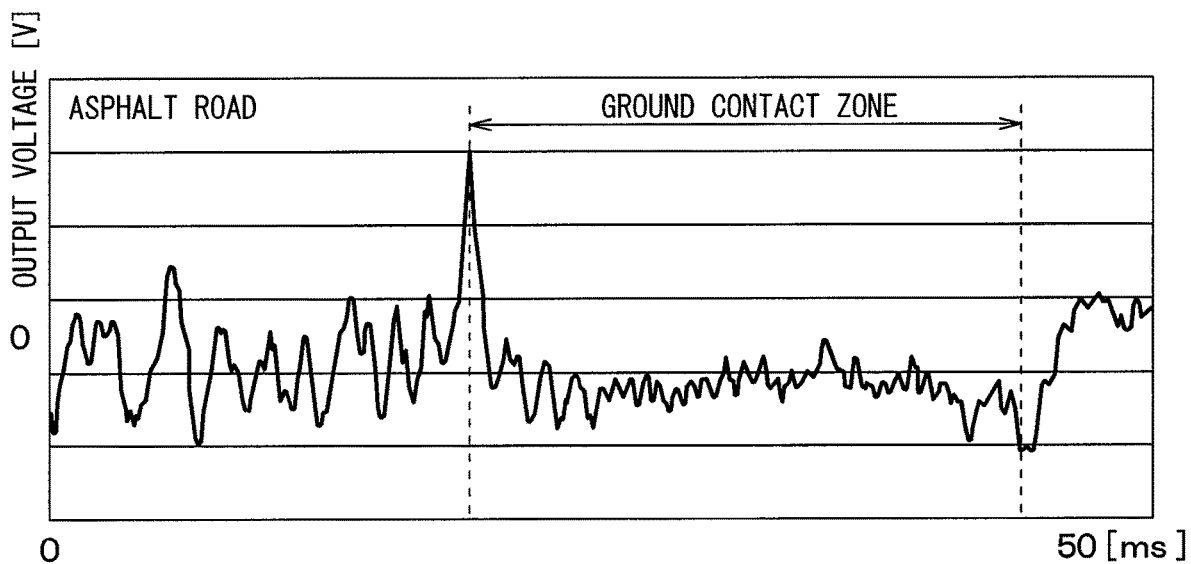
FIG. 5A is a chart showing a change in the output voltage of the acceleration sensor in case of traveling on a high μ road surface such as an asphalt road, a road surface μ of which is comparatively high.
Figure 5B:
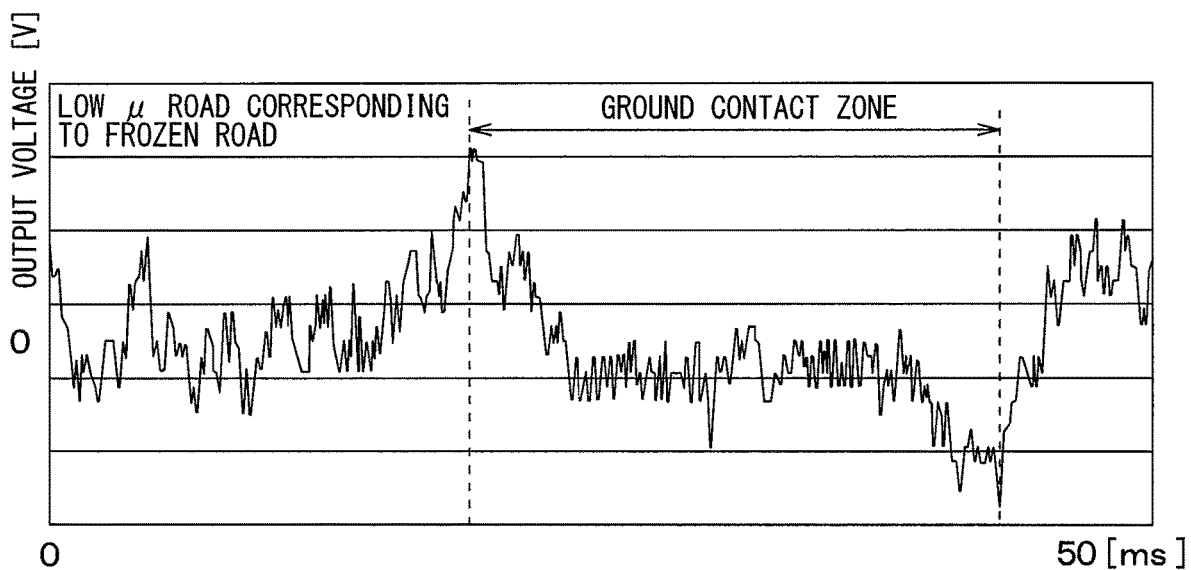
FIG. 5B is a chart showing a change in the output voltage of the acceleration sensor in case of traveling on a low μ road surface such as a frozen road, a road surface μ of which is comparatively low.

FIG. 5A shows a change of the output voltage of the acceleration sensor 12 in case of traveling on the high $\mu$ road surface like an asphalt road, the road surface $\mu$ of which is comparatively large. FIG. 5B shows a change of the output voltage of the acceleration sensor 12 in case of traveling on the low $\mu$ road surface like a road corresponding to a frozen road, the road surface $\mu$ of which is comparatively small.

As is evident from those figures, the first peak value and the second peak value appear at the start and the end of the ground contact zone, that is, the ground contact start time and the ground contact end time of the acceleration sensor 12, respectively, regardless of the road surface p. However, the output voltage of the acceleration sensor 12 changes as affected by the road surface $\mu$. For example, in case that the road surface $\mu$ is low like traveling on the low $\mu$ road surface, fine high frequency vibrations caused by slipping of the tire 3 are superimposed on the output voltage. This fine high frequency noise caused by slipping of the tire 3 is not superimposed so much in case that the road surface $\mu$ is high like traveling on the high $\mu$ road surface.

Figures 6, 7:
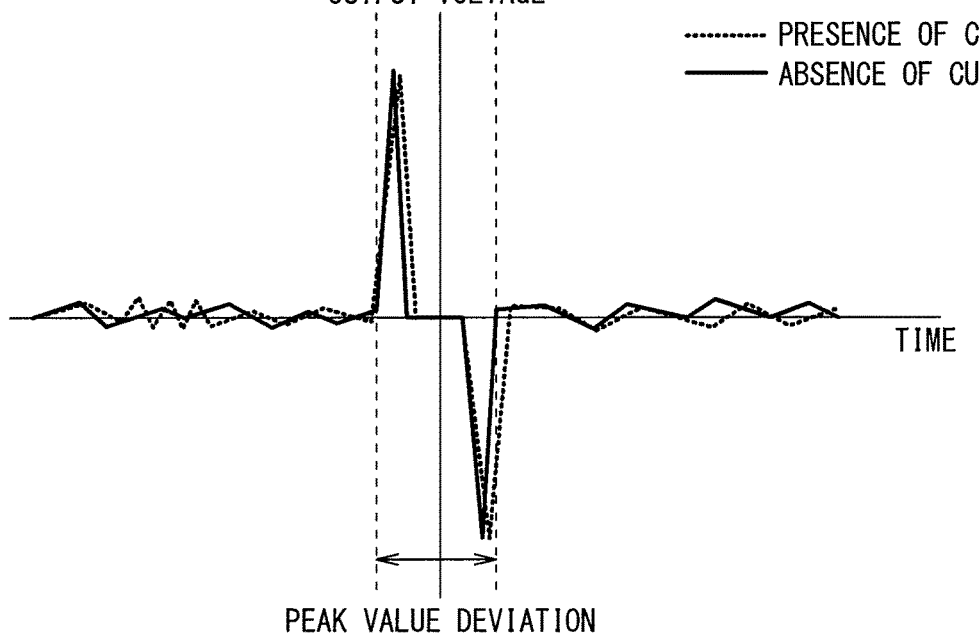
FIG. 6 is a chart showing a result of frequency analysis conducted on the output voltage during a ground contact period with respect to each case of traveling on the high μ road and the low μ road.
FIG. 7 is a waveform chart showing an output voltage of the acceleration sensor in case of presence and absence of a cut or recess in the tire.

For this reason, frequency analysis of the output voltage in the ground contact zone with respect to the high road surface $\mu$ and low road surface $\mu$ produces results shown in FIG. 6. That is, the frequency analysis result indicates a high level in a low frequency band in any cases of traveling the high $\mu$ road surface and the low $\mu$ road surface. However, in a high frequency band of 1 kHz or more, the level is higher in case of the low road surface $\mu$ than in case of the high road surface $\mu$. For this reason, the level of the high frequency components of the output voltage of the acceleration sensor 12 is the index indicating the road surface state.

Therefore, by calculating the level of the high frequency components of the output voltage of the acceleration sensor 12 in the ground contact zone by the level calculation unit 13b, it is possible to use the calculated level as the $\mu$ data. Further, it is possible to detect a type of the road surface corresponding to the road surface $\mu$ as the road surface state. For example, it is possible to determine the frozen road when the road surface $\mu$ is low.

For example, the high frequency component level is calculated as an integrated voltage value by extracting the high frequency components from the output voltage of the acceleration sensor 12 and integrating the high frequency components extracted during the interval of the ground contact zone. Specifically, the high frequency components of the frequency band fa to fb, in which it is assumed to change in correspondence to the road surface state or the road surface μ, are extracted by filtering or the like and a voltage of the high frequency components in the frequency band fa to fb extracted by the frequency analysis is integrated to acquire the integrated voltage value. For example, the high frequency components are charged in a capacitor. Thus the charge amount is greater in case that the road surface μ is low like traveling on the low μ road surface than in case that the road surface μ is high like traveling on the high μ road surface. By thus using the charge amount as the μ data, it is possible to estimate the road surface μ is lower as the charge amount indicated by the μ data is greater.

The data generation unit 13c generates the road surface data based on the calculation result of the level calculation unit 13b. For example, the data generation unit 13c uses the μ data as it is as the road surface data or generates data as the road surface data by determining the road surface state like the frozen road or the asphalt road based on the μ data.

Further, as described above, the control unit 13 includes the abnormality detection unit 13d, which detects a state, which will lead to a possible occurrence of abnormality of the tire 3 based on the detection signal of the acceleration sensor 12 and detects a possibility of actual occurrence of abnormality of the tire 3. Upon detection of the possibility of actual occurrence of abnormality, the control unit 13 functions to store it as a diagnosis history in the memory circuit unit 14.

Specifically, as described above, the detection signal of the acceleration sensor 12 exhibits the output voltage waveform shown in FIG. 4 each time the tire 3 makes one rotation. However, when an impact shock, which will cause an abnormality of the tire 3, is applied to the tire 3 like a case that the tire 3 rides on a step on a road during traveling of the vehicle, the output voltage waveform distorts. That is, vibration components arising from the impact shock is superimposed on the output voltage waveform. For example, when the impact shock is applied at the ground contact start at which the device arrangement location starts to contact the ground, the first peak value becomes larger than that of traveling a flat road. In this case, although dependent on a vehicle travel speed, the first peak value, which is 90 G on the flat road at the vehicle travel speed of 80 km/h, rises to 150 G or more. In addition, even in case that the impact shock is applied when the ground contact zone is not in contact with the ground, the output voltage waveform corresponding to a zone other than the ground contact zone also exhibits a large vibration waveform.

For this reason, by storing the output voltage waveform of the acceleration sensor 12 of one rotation of the tire 3 as a basic waveform for comparison, the impact shock is detected based on a difference of the present output voltage waveform of one rotation of the acceleration sensor 12 relative to the basic waveform. For example, the occurrence of impact shock is detected when the output voltage waveform becomes larger by a predetermined value or more relative to the basic waveform, like when the first peak value rises to 150 G or more or when a large G which is larger than the basic waveform by a predetermined value or more is generated at areas other than the first peak value and the second peak value.

Figure 8:
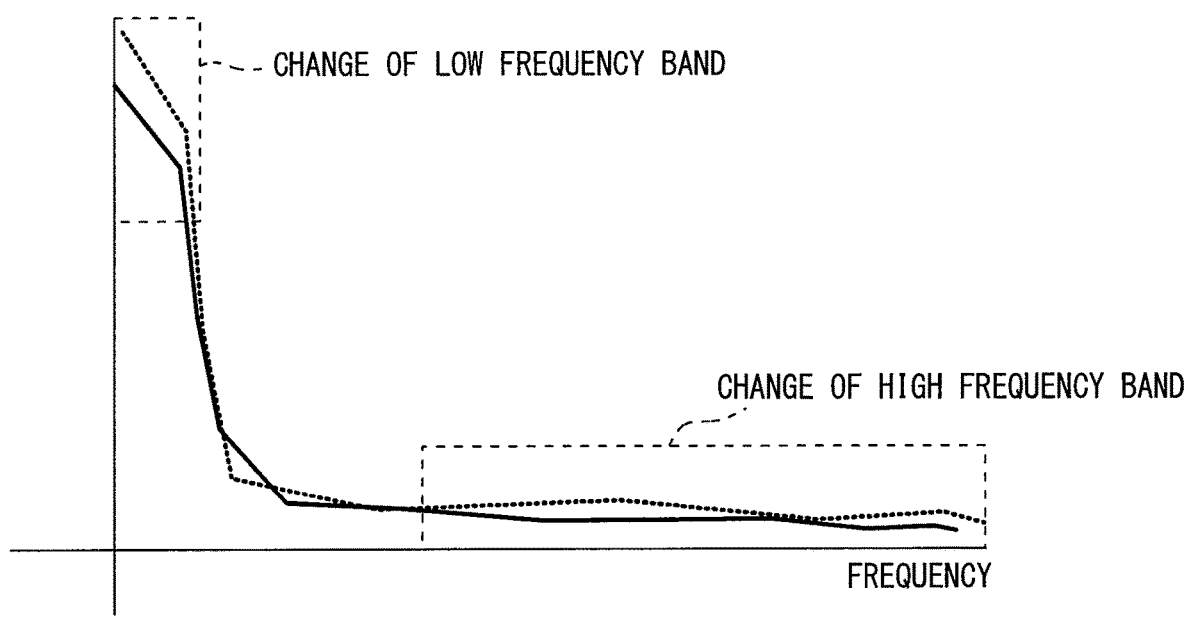
FIG. 8 is a chart showing a result of frequency analysis conducted on the output voltage shown in FIG. 7.

When the occurrence of the impact shock is detected, the output voltage waveform of the acceleration sensor 12 during one rotation of the tire 3 before and after the detection, for example, the output voltage waveforms of the acceleration sensor 12 outputted during one rotation of the tire 3 before the detection and one rotation of the tire 3 immediately are compared thereby to check a change of the output voltage waveform. For example, as shown in FIG. 7, when a cut or recess is generated in the tire 3 by the impact shock, the output voltage waveforms shift between pre-detection time and post-detection time. It is thus possible to detect a possibility of occurrence of abnormality such as the cut or recess on the tire 3 based on a change of the output voltages of the pre-detection time and the post-detection time of the impact shock. For example, as shown in FIG. 8, the detection signal of the acceleration sensor 12 is subjected to a frequency-analysis such as Fourier Transform processing. As a result, depending on the presence or absence of abnormality of the tire 3, a difference appears in the analysis results in the low frequency band or the high frequency band. Base on this difference, it is possible to detect that the abnormality arose possibly in the tire 3. For example, the difference between the analysis results in the low frequency band or the high frequency band is equal to or larger than a predetermined threshold value, it is possible to detect a possibility that the abnormality arose in the tire 3.

Thus, the control unit 13 detects the possibility of occurrence of abnormality of the tire 3 after detecting accurately a state, under which the abnormality of the tire 3 such as the cut or recess of the tire 3 will arise. After detecting the possibility of occurrence of abnormality, the control unit 13 sends it to the memory circuit unit 14 as the diagnosis history or causes the RF transmitter circuit 16 to transmit it as data related to the diagnosis history when needed. Further, as described later, the control unit 13 causes the RF transmitter circuit 16 to transmit the data related to the diagnosis history when a command of response related to the diagnosis history is received from the tool 200.

The memory circuit unit 14 is a memory unit, which executes storing, reading out and erasing of data in response to instructions from the control unit 13. For example, the memory circuit unit 14 stores such information as the diagnosis history upon receiving a signal from the control unit 13 indicating the detection of abnormality of the tire. Further, the memory circuit unit 14 reads out the diagnosis history and sends it to the control unit 13 upon receiving a command of read-out of the data related to the diagnosis history from the control unit 13.

The LF receiver circuit 15 is a receiver unit which receives a command input through a tool 200 or the like. For example, when an LF wave including an instruction command is transmitted to the tire-mounted sensor 1 through the tool 200 at, for example, a car repair shop, the instruction command is transmitted to the control unit 13 through the LF receiver circuit 15. The control unit 13 is configured to output a read-out command to the memory circuit unit 14 for reading out the diagnosis history in response to the instruction command so that the data related to the diagnosis history are read out from the memory circuit unit 14 and the data read out are transmitted from the RF transmitter circuit 16.

The RF transmitter circuit 16 forms a transmission unit, which transmits to the receiver 21 the road surface data such as the μ data and the data related to the diagnosis history sent from the data generation unit 13c. The communication between the RF transmitter circuit 16 and the receiver 21 may be executed by conventional short-range radio communication technology like Bluetooth (registered trademark). Although the road surface data and the diagnosis history may be transmitted at arbitrary timing, the road surface data is transmitted from the RF transmitter circuit 16 in the present embodiment in response to a transmission trigger sent from the zone extraction unit 13a at the ground contact end time of the acceleration sensor 12. It is thus possible to reduce power consumption by executing the data transmission by the RF transmitter circuit 16 not continuously but limitedly at the ground contact end time of the acceleration sensor 12.

The road surface data and the data related to the diagnosis history are sent with individual identification information (hereinafter referred to as ID information) provided for each tire 3 of a road wheel of the vehicle. The position of each wheel is specified by a conventional wheel position detection device which detects to which position of the vehicle the wheel is attached. Thus it is possible to determine to which wheel the data belongs by sending the road surface data and the data related to the diagnosis history together with the ID information to the receiver 21.

It is assumed here that the data related to the diagnosis history is transmitted together with the road surface data from the RF transmitter circuit 16. It is also possible to alternatively store those data in different frames and transmit at different timings.

The receiver 21 receives the road surface data transmitted from the tire-mounted sensor 1, estimates the road surface state based on the received road surface data, sends the estimated road surface state to the notification device 22 and conveys, if necessary, the road surface state to a driver from the notification device 22. Thus, the driver tries to drive the vehicle in a manner matching the road surface state and is enabled to avoid danger to the vehicle. For example, the estimated road surface state may be displayed always by the notification device 22 or the road surface state may be displayed to warn the driver only when the vehicle need be driven more carefully than usual, for example, when the estimated road surface state corresponds to the low µ road like the wet road or the frozen road. Further, the road surface state may be sent to an electronic control unit (hereinafter referred to as ECU) such as a brake ECU, which executes vehicle motion control, from the receiver 21 so that the vehicle motion control is executed based on the sent road surface state.

The receiver 21 further receives the data related to the diagnosis history transmitted from the tire-mounted sensor 1 and grasps the diagnosis history based on the received data. If necessary, the receiver 21 sends the data related to the diagnosis history to the notification device 22 so that the notification device 22 displays that there is a diagnosis history or there is a possibility of occurrence of abnormality of the tire 3. It is thus possible to recognize in advance of an occurrence of failure in vehicle travel that the tire 3 has a possibility of occurrence of abnormality. It is therefore possible to avoid the failure in the tire 3, which will potentially lead to the occurrence of failure in vehicle travel.

The notification device 22 is configured with a meter display device for example and used to notify the driver of the road surface state. In case that the notification device 22 is configured with the meter display device, it is located at a position which the driver is capable of recognition during driving of the vehicle, for example, within an instrument panel in the vehicle. The meter display device notifies the driver visually of the road surface state and the diagnosis history in a mode enabling recognition of the road surface state and the diagnosis history by displaying the road surface state, when the road surface state and the diagnosis history are sent from the receiver 21.

The notification device 22 may alternatively be configured with a buzzer or voice guidance device. In such a case, the notification device 22 notifies the driver of the road surface state and the diagnosis history audibly by buzzer sound or voice guidance. Although the meter display device is exemplarily referred to as the notification device 22 for providing visual notification, the notification device 22 may be configured with a display device like a head-up display which provides information display.

The road surface state estimation device 100 according to the present embodiment is configured as described above. Each unit forming the vehicle side system 2 is connected through an in-vehicle LAN (Local Area Network) like CAN (Controller Area Network) communication. Thus each unit is capable of communicating information mutually through the in-vehicle LAN.

An operation of the tire-mounted sensor 1 of the road surface state estimation device 100 according to the present embodiment will be described next.

As described above, in the tire-mounted sensor 1, the road surface data is acquired based on the detection signal of the acceleration sensor 12 by analyzing in the control unit 13 the output voltage waveform at every one rotation of the tire 3. The road surface data is transmitted, when the transmission trigger is outputted from the control unit 13 to the RF transmitter circuit 16 at timing of the second peak value of the output voltage waveform.

In the tire-mounted sensor 1, when the occurrence of impact shock is detected based on the detection signal of the acceleration sensor 12, the detection signals, that is, output voltage waveforms, of the acceleration sensor 12, which are outputted during one rotation of the tire 3 before and after the detection of impact shock, are compared. That is, the detection signals of the acceleration sensor 12 outputted before and after the detection of impact shock or the frequency analysis results of such detection signals are compared. It is thus detected that the abnormality has occurred possibly in the tire 3. In case that the possibility of occurrence of abnormality of the tire 3 is detected, it is stored in the memory circuit unit 14 as the diagnosis history. The control unit 13 sends the diagnosis history to the RF transmitter circuit 16 so that the RF transmitter circuit 16 transmits the diagnosis history together with or separately from the road surface data.

In this embodiment, as a method of comparing the detection signals of the acceleration sensor 12 outputted before and after the occurrence of impact shock, the detection signals of the acceleration sensor 12, each of which is outputted in one rotation of the tire 3, or the results of the frequency analyses of such detection signals are compared each other. This is only one example and other methods may be used. For example, the detection signals of the tire-mounted sensor 1, each of which is outputted during plural rotations of the tire 3, or results of frequency analyses of such detection signals may be compared with each other. Further, average values of the results of frequency analyses, each of which is executed in respect of plural rotations of the tire 3, may be compared.

On the other hand, when the data is transmitted from the RF transmitter circuit 16, the receiver 21 receives it, estimates the road surface state based on the road surface data and conveys the estimated road surface state to the notification device 22. In addition, upon reception of the data related to the diagnosis history, the receiver 21 grasps the diagnosis history based on the received data and sends it to the notification device 22 if necessary. Thus it is possible to notify from the notification device 22 that there is the diagnosis history or there is the possibility of occurrence of abnormality of the tire 3. As a result, it is possible to notify the driver of the abnormality of the tire 3 in advance before an occurrence of future failure of the tire, which will arise from the abnormality of the tire, that is, before the occurrence of failure of the tire, which will lead to the failure of vehicle travel.

Further, when the instruction command is sent to the tire-mounted sensor 1 through the tool 200 at the car repair shop and the like, the instruction command is received by the LF receiver circuit 15. When this instruction command is sent to the control unit 13, the control unit 13 reads out the diagnosis history stored in the memory circuit unit 14. In case that the diagnosis history is stored, the data related to the diagnosis history is sent to the tool 200 through the RF transmitter circuit 16. Thus the diagnosis history is sent to the tool 200 and it is made possible to recognize the possibility of abnormality of the tire 3 at the car repair shop or the like.

Figure 9:
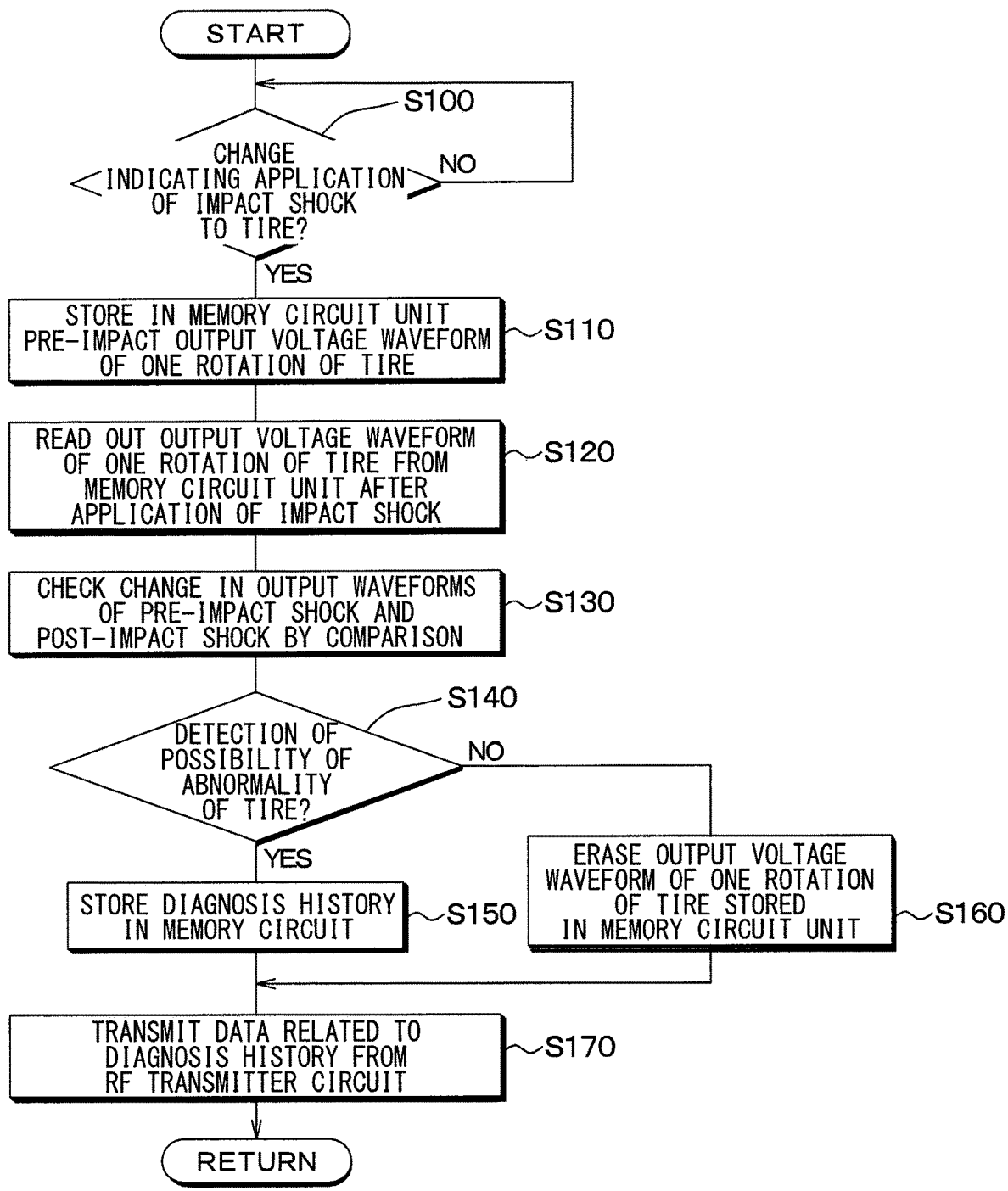
FIG. 9 is a flowchart of diagnosis history storing processing.

Detailed processing executed by the tire-mounted sensor 1 will be described with reference to FIG. 9. FIG. 9 is a flowchart showing details of diagnosis history storing processing executed by the control unit 13 at every predetermined control period.

First, at step S100, the control unit 13 checks whether the tire 3 indicated a change caused by the impact shock for detecting whether an abnormality will possibly arise in the tire 3. The change caused by the impact shock to the tire 3 is distortion of the output voltage waveform of the acceleration sensor 12. In this checking, the control unit 13 compares the output voltage waveform of the acceleration sensor 12 with the basic waveform and checks based on the difference from the basic waveform whether the output voltage waveform of the acceleration sensor 12 is distorted. In case of an affirmative determination at step S100, the control unit 13 executes step S110 and subsequent steps. In case of a negative determination at step S100, the control unit 13 repeats execution of step S100.

At step S110, the control unit 13 stores the output voltage waveform, which is outputted during one rotation of the tire the 3 before the impact shock, to the memory circuit unit 14. Then at step S120, the control unit 13 reads out after the impact shock the output voltage waveform stored at step S110. The control unit 13 checks at step S130 whether the output voltage waveform has changed by comparing the output voltage waveform of the acceleration sensor 12, which is outputted during one rotation of the tire 3 before the impact shock and read out at step S120, with the output voltage waveform of the acceleration sensor 12, which is outputted during one rotation of the tire 3 after the impact shock.

Then at step S140, the control unit 13 checks whether there is a possibility of occurrence of an abnormality of the tire 3 based on a check result of step S130. That is, it is likely that the abnormality has occurred in the tire 3 because of the impact shock in case that there is the change between the output voltage waveforms of the acceleration sensor 12 outputted during one rotation of the tire 3 before and after the impact shock. For this reason, in case that the output voltage waveforms of the acceleration sensor 12 outputted before and after the impact shock change, the control unit 13 makes a positive determination at this step and stores the diagnosis history to the memory circuit unit 14 at step S150. In case that the output voltage waveforms of the acceleration sensor 12 outputted before and after the impact shock do not change, the control unit 13 makes a negative determination at this step and erases the output voltage waveform of one rotation of the acceleration sensor 12, which has been stored to the memory circuit unit 14, at step S160.

Then at step S170, the control unit 13 causes the RF transmitter circuit 16 to transmit the data related to the diagnosis if necessary and finishes the diagnosis history storing processing. In case that the data related to the diagnosis history is transmitted from the RF transmitter circuit 16, it is received by the receiver 21 and the occurrence of abnormality of the tire 3 is notified through the notification device 22 in correspondence to the diagnosis history.

As described above, the road surface state estimation device 100 according to the present embodiment detects accurately the state in which the abnormality is likely to occur in the tire 3 based on the detection signal of the acceleration sensor 12 used to detect the road surface state and detects the possibility of occurrence of abnormality of the tire 3.

In case of detection of the possibility of occurrence of abnormality of the tire 3, the road surface state estimation device 100 stores it as the diagnosis history. It is thus possible to convey the possibility of abnormality of the tire 3 to a driver in advance by notifying the diagnosis history or the possibility of abnormality of the tire 3 through the notification device 22 in the vehicle side system 2. Further, when the diagnosis history is to be confirmed through the tool 200 at the car repair shop or the like, the diagnosis history stored in the tire-mounted sensor 1 is transmitted from the RF transmitter circuit 16. Thus it is possible to convey the possibility of abnormality of the tire 3 at the car repair shop or the like.

Since the possibility of abnormality of the tire 3 is detected based on the detection signal of the acceleration sensor 12, which is used to detect the road surface state, the same sensor is used in common and contributes to cost reduction. Further, it is possible to detect the possibility of occurrence of abnormality of the tire 3 and estimate the road surface state by only one acceleration sensor, which detects acceleration in only one direction.

That is, since acceleration in a radial direction of a tire is measured according to patent document 1, another acceleration sensor is needed to measure acceleration in the tangential direction of the tire for measurement of the road surface state. Thus two acceleration sensors are needed resulting in an increase in the number of components and an increase in cost. On the contrary, the road surface state estimation device 100 according to the present embodiment is provided as the tire-mounted sensor, which can detect accurately the state leading to the abnormality of the tire and store the abnormality of the tire while detecting the road surface state without needing acceleration sensors for detecting accelerations in two directions.

Second Embodiment

A second embodiment will be described. The present embodiment is different from the first embodiment in that the vehicle side system 2 is configured to detect the possibility of occurrence of abnormality of the tire 3. Other configurations are similar to the first embodiment and hence only differences from the first embodiment will be described.

Figure 10:
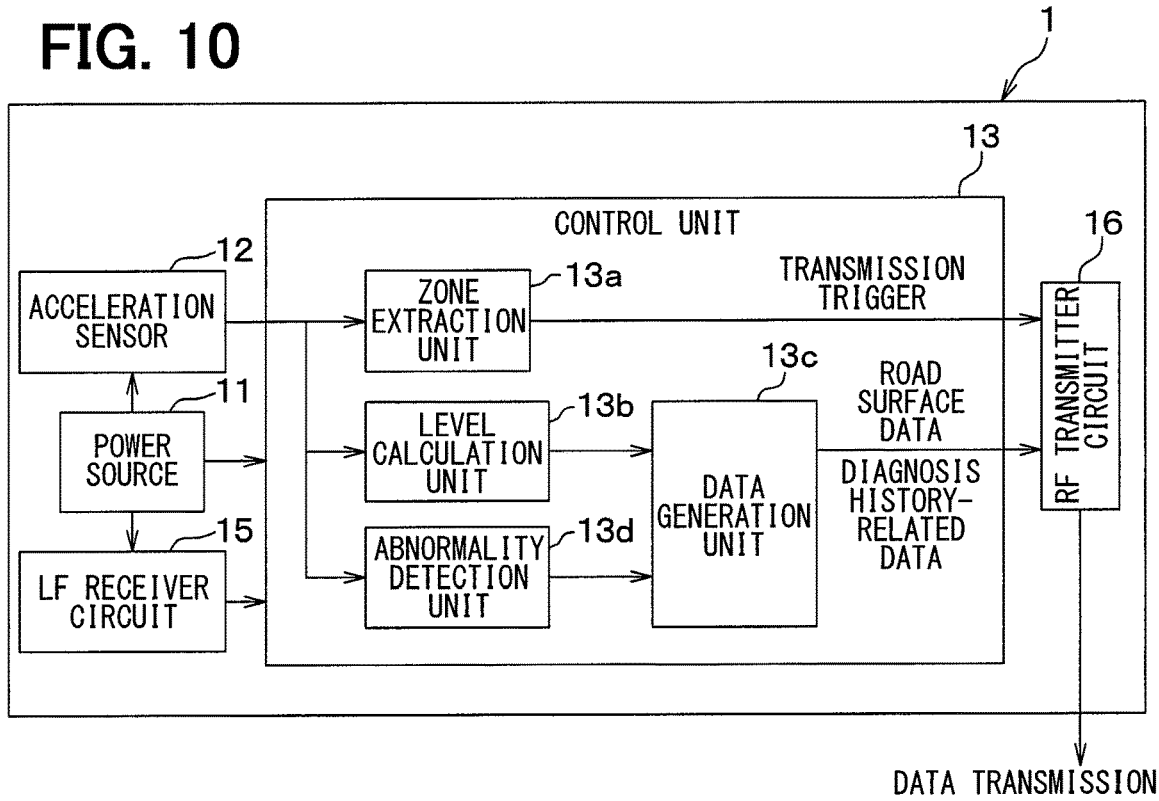
FIG. 10 is a block diagram of a tire-mounted sensor according to a second embodiment.

As shown in FIG. 10, the tire-mounted sensor 1 according to the present embodiment is not provided with the memory circuit unit 14 provided in the first embodiment. Alternatively, the vehicle side system 2 detects that the abnormality is likely to occur in the tire 3 and the abnormality of the tire 3 has possibly occurred.

Specifically, in place of the road surface data acquired by the tire-mounted sensor 1 based on the detection signal of the acceleration sensor 12, or together with the road surface data, the data of the output voltage waveform of the acceleration sensor 12 is transmitted to the receiver 21. For example, the data generation unit 13c generates data of the output voltage waveform by converting original data of the detection signal of the acceleration sensor 12 according to a predetermined protocol and sends it to the RF transmitter circuit 16 as the data related to the diagnosis history to be transmitted. Upon reception of the data of the output voltage waveform, the receiver 21 detects, based on this output voltage waveform, that the abnormality is likely to occur in the tire 3 because of the impact shock and the like and that the abnormality has occurred possibly in the tire 3. This detection method is similar to that executed in the first embodiment.

Upon detection of the possibility of occurrence of abnormality of the tire 3, the receiver 21 stores it in an internal memory (not shown) or the like as the diagnosis history and, if necessary, sends it to the notification device 22 thereby to notify the diagnosis history or the possibility of occurrence of abnormality of the tire 3.

As described above, in the vehicle side system 2 and not in the tire-mounted sensor 1, it is possible to detect the state, which will lead to the occurrence of abnormality of the tire 3, or the possibility of actual occurrence of abnormality and store it as the diagnosis history. Thus it is possible to provide a similar advantage as the first embodiment.

Although the road surface data is acquired from the tire-mounted sensor 1 and the data of the output voltage waveform of the acceleration sensor 12 is transmitted from the tire-mounted sensor 1, only the data of the output voltage waveform of the acceleration sensor 12 may be transmitted. In this case, the tire-mounted sensor 1 need not detect the road surface state and this function may be borne by the vehicle side system 2. According to this embodiment, because the tire-mounted sensor is required to only transmit the data of the output voltage waveform of the acceleration sensor 12, it is possible to simplify the device, reduce power consumption and improve life of a battery used as the power source 11.

Third Embodiment

A third embodiment will be described. The present embodiment is different from the first embodiment in that the state of possibility of occurrence of abnormality of the tire 3 is detected differently. Other configurations are similar to the first embodiment and hence only differences from the first embodiment will be described.

Figure 11:
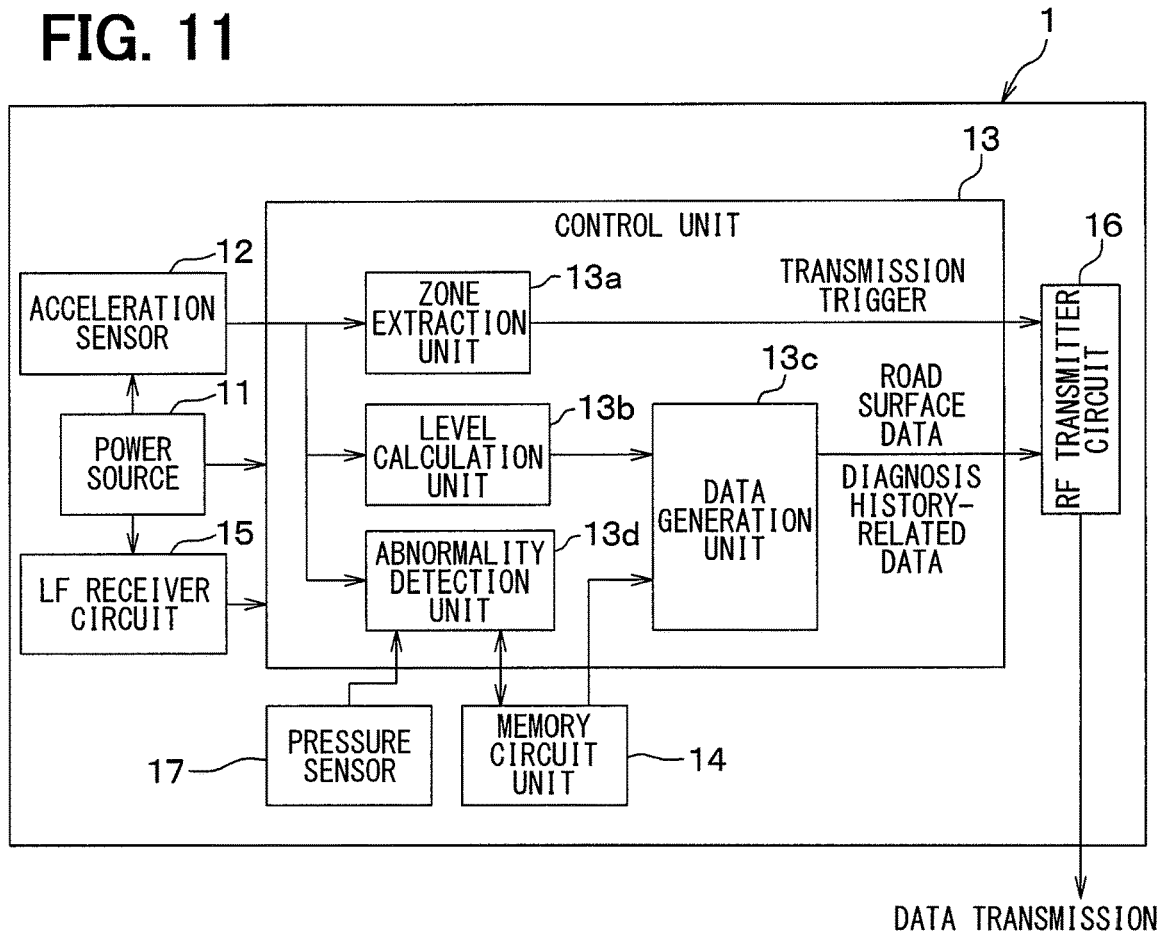
FIG. 11 is a block diagram of a tire-mounted sensor according to a third embodiment.

As shown in FIG. 11, the tire-mounted sensor 1 according to the present embodiment is provided with a pressure sensor 17. The pressure sensor 17 is formed of a diaphragm-type sensor using a silicon substrate to output a detection signal corresponding to a tire air pressure, for example. The tire air pressure changes with deformation of the tire 3 when the tire 3 receives the impact shock. It is therefore possible to detect that the tire 3 has received the impact shock based on the change in the tire air pressure. For example, the control unit 13 determines that the impact shock has been received when the tire air pressure changed largely, for example, the tire air pressure increased rapidly at time of riding over a step on a road surface, and then returned to a normal pressure again after a predetermined period.

When the impact shock is detected based on the tire air pressure, the change of the output voltage waveform of the acceleration sensor 12 is checked by comparing the output voltage waveforms outputted during one rotation of the tire 3 before and after the detection. Thus the abnormality of the tire 3 such as the occurrence of a cut and dent caused by the impact shock is detected.

As described above, the impact shock is detected based on the tire air pressure and a presence and absence of abnormality of the tire 3 is detected based on the vibration applied to the tire 3. Thus it is also possible to provide a similar advantage as the first embodiment by this method.

Other Embodiment

The present disclosure made with reference to the embodiments described above is not limited to the disclosed embodiments but may include various modifications and variations which are within equivalent scopes. In addition, various combinations and forms as well as other combinations and forms, which include only one element, more or less than that, are covered by and within the scope of the present disclosure.

For example, in the embodiments described above, the diagnosis history, which indicates the possibility of occurrence of abnormality because of the impact shock applied to the tire 3, is stored in the tire-mounted sensor 1 provided in the road surface state estimation device 100. Further, based on the data from the tire-mounted sensor 1, the diagnosis history is stored in the vehicle side system 2 and notified. This is just one example, which incorporates the diagnosis notification device into the road surface state estimation device 100 in addition to the tire-mounted sensor 1 or the diagnosis history storage device for storing the diagnosis history. These devices may be configured separately from the road surface state estimation device 100. In the embodiments described above, a part of the road surface state estimation device 100 which detects the possibility of occurrence of abnormality of the tire 3 and stores it as the diagnosis history forms the diagnosis history storage device. The combination of the tire-mounted sensor 1 or the diagnosis history storage device and a part of the vehicle side system 2 including the receiver 21 and the notification device 22 corresponds to the diagnosis notification device.

Further, in the road surface state estimation device 100 described in each embodiment, the ground contact zone is specified using the detection signal of the acceleration sensor 12 forming the vibration detection unit and the result of calculation of the level of the high frequency components in the detection signal, which is generated in the ground contact zone, is used as the road surface data. However, this is also one exemplary method of detecting the road surface state using the detection signal of the vibration detection unit. It is also possible to detect the road surface state by other methods using the detection signal of the vibration detection unit.

Further, although the vibration detection unit is formed exemplarily of the acceleration sensor 12, the vibration detection unit may be formed of other vibration detection elements such as a piezoelectric component. Further, the power source 11 may be formed of a power generating element without being limited to batteries. For example, in case of using the vibration detection and power generation element, the vibration detection and power generation element forms not only the vibration detection unit but also the power source 11.

Further, in case of the second embodiment, the receiver 21 functions as a control unit, which detects the impact shock applied to the tire 3 based on the output voltage waveform of the acceleration sensor 12 and stores the diagnosis history. This is also one example. The control unit may alternatively be provided separately from the receiver 21 and the other ECU such as a brake ECU may be configured to operate as the control unit.

What is claimed is:

1. A tire-mounted sensor attachable to a back surface of a tire comprising:
    a vibration detection unit configured to output an output voltage corresponding to a magnitude of vibration of the tire as a detection signal;
    a signal processing unit configured to detect an application of impact shock to the tire based on a change in an output voltage waveform indicated by the detection signal of the vibration detection unit and to detect an abnormality of the tire by comparison of the output voltages outputted before and after a detection of the application of impact shock; and
    a memory unit configured to store the abnormality of the tire as a diagnosis history upon detection of the abnormality of the tire.

2. A tire-mounted sensor attachable to a back surface of a tire comprising:
    a vibration detection unit configured to output an output voltage corresponding to a magnitude of vibration of the tire as a detection signal;
    a pressure sensor configured to detect a tire air pressure inside the tire;
    a signal processing unit configured to detect an application of impact shock to the tire based on a change in the tire air pressure and to detect an abnormality of the tire by comparison of the output voltages of the vibration detection unit outputted before and after a detection of the application of impact shock; and
    a memory unit configured to store the abnormality of the tire as a diagnosis history upon detection of the abnormality of the tire.

3. The tire-mounted sensor according to claim 2, wherein:
    the signal processing unit is further configured to detect the application of impact shock to the tire when the tire air pressure which has changed returns to the tire air pressure present before the detection of the change in the tire air pressure.

4. The tire-mounted sensor according to claim 1, wherein:
    the signal processing unit is further configured to detect the application of the impact shock to the tire when the output voltage waveform increases to be larger than a basic waveform, which is set to be the output voltage waveform outputted when a vehicle travels a flat road, by more than a predetermined value.

5. The tire-mounted sensor according to claim 1, wherein:
    the signal processing unit is further configured to detect the abnormality of the tire by comparing the output voltage waveforms, which are outputted during one rotation of the tire before and after the detection of application of the impact shock, or comparing frequency analysis results of the output voltage waveforms.

6. The tire-mounted sensor according to claim 1, further comprising:
    a receiver unit configured to receive an instruction command supplied from an external side; and
    a transmitter unit configured to transmit data related to the diagnosis history,
    wherein the signal processing unit is further configured to read out the diagnosis history stored in the storage unit upon a reception of the instruction command by the receiver unit and to send the data related to the diagnosis history to be transmitted from the transmitter unit.

7. A diagnosis notification device comprising:
    the tire-mounted sensor according to claim 6 and including the transmitter unit for transmitting the data related to the diagnosis history;
    a receiver and a notification device, which are provided in a vehicle body side and configured to receive the data related to the diagnosis history and to execute a notification of the data related to the diagnosis result, respectively.

8. A diagnosis history storage device comprising:
    a tire-mounted sensor attached to a back surface of a tire and including a vibration detection unit configured to output an output voltage corresponding to a magnitude of vibration of the tire as a detection signal, a signal processing unit configured to generate data of an output voltage waveform indicated by the detection signal of the vibration detection unit and a transmitter unit configured to transmit data of the output voltage waveform; and
    a receiver and a vehicle side system, which are provided in a vehicle body side,
    wherein the receiver is configured to receive the data of the output voltage waveform, and
    the vehicle side system is configured to detect an application of impact shock to the tire based on a change in the output voltage waveform indicated by the data of the output voltage waveform, to detect an abnormality of the tire by comparison of the output voltages outputted before and after the detection of the application of impact shock, and to store the abnormality of the tire as a diagnosis history.

9. A diagnosis notification device comprising:
    the diagnosis history storage device according to claim 8; and
    a notification device configured to execute a notification of data related to the diagnosis history.

10. The tire-mounted sensor according to claim 2, wherein:
    the signal processing unit is further configured to detect the application of the impact shock to the tire when the output voltage waveform increases to be larger than a basic waveform, which is set to be the output voltage waveform outputted when a vehicle travels a flat road, by more than a predetermined value.

11. The tire-mounted sensor according to claim 2, wherein:
    the signal processing unit is further configured to detect the abnormality of the tire by comparing the output voltage waveforms, which are outputted during one rotation of the tire before and after the detection of application of the impact shock, or comparing frequency analysis results of the output voltage waveforms.

* * * * *